United States Patent [19]
Cline et al.

[11] Patent Number: 6,020,039
[45] Date of Patent: Feb. 1, 2000

[54] AUTOMOBILE DOOR IMPACT BEAM

[75] Inventors: Richard S. Cline, Crete; Jack M. Shapiro, Homewood, both of Ill.

[73] Assignee: Inland Steel Company, Chicago, Ill.

[21] Appl. No.: 09/063,835

[22] Filed: Apr. 21, 1998

[51] Int. Cl.$^7$ ............................. B29D 22/00; B60J 5/00
[52] U.S. Cl. ..................... 428/36.9; 428/156; 428/188; 428/213; 296/146.6; 296/188
[58] Field of Search ................................ 428/34.1, 36.9, 428/156, 172, 188, 212, 213; 296/146.6, 188, 189; 52/720.2, 735.1

[56] References Cited

U.S. PATENT DOCUMENTS

| | | | |
|---|---|---|---|
| 2,508,032 | 5/1950 | Kennedy | 189/37 |
| 2,916,324 | 12/1959 | Graham | 296/28 |
| 3,224,154 | 12/1965 | Toti et al. | 52/520 |
| 3,332,197 | 7/1967 | Hinkle | 52/731 |
| 3,868,141 | 2/1975 | Johnson | 296/189 |
| 3,868,804 | 3/1975 | Tantlinger | 52/98 |
| 3,977,149 | 8/1976 | Haynes et al. | 52/731 |
| 4,002,000 | 1/1977 | Howard et al. | 52/729 |
| 4,090,734 | 5/1978 | Inami et al. | 296/146 |
| 4,378,395 | 3/1983 | Asoshina et al. | 428/158 |
| 4,397,914 | 8/1983 | Miura et al. | 428/43 |
| 4,411,466 | 10/1983 | Koike | 296/188 |
| 4,451,518 | 5/1984 | Miura et al. | 428/137 |
| 4,554,718 | 11/1985 | Ollinger et al. | 29/155 R |
| 4,580,380 | 4/1986 | Ballard | 52/309.9 |
| 4,796,946 | 1/1989 | Wilson et al. | 296/146 |
| 4,863,771 | 9/1989 | Freeman | 428/188 |
| 5,080,427 | 1/1992 | Sturrus et al. | 296/188 |
| 5,089,311 | 2/1992 | Lyon | 428/188 |
| 5,232,261 | 8/1993 | Kuroda et al. | 296/146.4 |
| 5,813,718 | 9/1998 | Masuda et al. | 296/146.6 |
| 5,813,719 | 9/1998 | Kowalski | 296/146.6 |

FOREIGN PATENT DOCUMENTS

| | | | |
|---|---|---|---|
| 56-156717 | 12/1981 | Japan | 148/333 |
| 57-013145 | 1/1982 | Japan | 148/333 |

OTHER PUBLICATIONS

Fine et al., "Development of Lightweight Door Intrusion Beams Utilizing an Ultra High Strength Steel", Feb. 24–28, 1975.

Ishizawa et al., "Utra–High Strength ERW Tubes for use as Automobile Door Impact Beams", NKK Technical Review, Jul. 1994, pp. 8–15.

Abstract of "Plastic/Metal Support Beam Improves Car Safety, Saves Weight", Advanced Materials, Apr. 8, 1996, pp. 3–4.

Abstract of "Kobe Steel Develops Advanced Aluminum Alloy for Automobile Door Beam", Japan Metal Bulletin, Mar. 1, 1993, p. 7.

P. Garnweidner, "Anwendung Von Aluminum Bei Einem Türverstärkungsteil" ("The Use of Aluminum in an Automobile Door Reinforcement"), *Aluminum,* Sep. 1989, pp. 897–898, 900. (German lanuage document).

Kecman et al., "Prediction of Deep Bending Collapse Characteristics of Car Body Beams", Regression Analysis, 1990.

"Ultra High Strength Steel Becoming a Key Material in Critical Safety Components", High Strength Steel Bulletin, 1997, pp. 1–12.

T. Furukawa, "Car Door Beam Takes a Wallop as Well as Any", American Metal Market, Mar. 1, 1993, pp. 4 and 11.

D. Meadows, "Structural Extrusions Opportunities in Lightweight Motor Vehicle", *The European Automotive Industry Meets the Challenges of the Year 2000,* European Automobile Engineers Cooperation, Jun., 1995, pp. 1–11.

H. Nosho et al., "Miniaturization and Weight Reduction of Door Guard Beam by Using Utra High Strength Steel", Eighth International Technical Conference on Experimental Safety Vehicles, NTHSA, 1980, pp. 576–587.

*Primary Examiner*—Donald Loney
*Attorney, Agent, or Firm*—Marshall, O'Toole, Gerstein, Murray & Borun

[57] ABSTRACT

An improved strengthening or reinforcing member, and in particular an automotive vehicle door reinforcing beam, constructed from ultra high strength steel is disclosed. The door reinforcing beam has a substantially trapezoidal shaped cross-sectional geometry and optionally can include an additional reinforcement extending over a central portion of the beam. In an alternative embodiment, a rounded outboard flange portion can be substituted for a generally flat outboard flange portion. The door reinforcing beam exhibits a substantial improvement in load carrying capability for a given mass, as compared to door reinforcing beams having other cross-sectional geometries, such as hat-shaped cross-sectional geometries.

8 Claims, 2 Drawing Sheets ated reinforcing beam 14 is positioned transversely within
AUTOMOBILE DOOR IMPACT BEAM

FIELD OF THE INVENTION

This invention relates to a novel and improved strengthening or reinforcing member of high strength steel that is adapted particularly for strengthening or reinforcing a metal panel or plate. More specifically, the invention relates to a novel and improved beam for reinforcing an automotive vehicle door.

BACKGROUND OF THE INVENTION

In the automotive vehicle industry today, it is necessary to comply with government regulations that establish certain minimum strength requirements for the side doors of the vehicles. The purpose of such regulations is to minimize the safety hazard caused by an intrusion into the passenger compartment in a side impact accident.

Various types of reinforcing door beams have been proposed to meet these requirements, e.g., tubular steel beams, sheet steel stampings, and roll formed high strength steel sections of various configurations. Engineers responsible for designing reinforcing door beams must contend with a number of requirements that often conflict with one another. For example, it is desirable to maximize the performance of reinforcing door beams by designing beams that absorb high loads (principally bending loads), deflect significantly before failure, and absorb as much energy as possible during the absorption of impact loads. At the same time, it is also desirable to minimize the weight and size of reinforcing door beams. With regard to size, placement of a door reinforcing beam within an automobile door assembly makes it important for the door reinforcing beam to have a relatively small cross-sectional geometry, in order to avoid interference with other structures and/or mechanisms within the door, such as those used to operate a window associated with the door. Such size and weight considerations can make it difficult to achieve the desired performance of reinforcing door beams for load capacity, deflection before failure, and impact energy absorption.

Previously proposed door beams provided the desired degree of high strength, but often presented other disadvantages. For example, martensitic steel has limited ductility, thus placing some restrictions on the permissible cross sectional configurations obtainable by roll forming. Accordingly, past designs for door reinforcement members constructed of high strength martensitic steel typically had cross-sectional geometries, such as, for example, a hat-shaped cross-sectional geometry, that buckled or spread on bending, thereby reducing mass effectiveness in providing side impact protection.

SUMMARY OF THE INVENTION

The present invention is directed to an improved roll formed, ultra high strength steel beam having a closed cross-sectional geometry. More particularly, the present invention is directed to roll formed, ultra high strength steel beams having a closed cross-sectional, and generally trapezoidal shaped, geometry.

This is accomplished by forming the closed cross-sectional geometry by induction welding opposite edges of the roll formed beam to one another. As used herein, the term "ultra high strength steel" means steel having a yield strength of 80 KSI (5.52 MPa) or higher.

Other features and advantages are inherent in the methods and apparatus claimed and disclosed or will become apparent to those skilled in the art from the following detailed description in conjunction with the accompanying drawings.

BRIEF DESCRIPTION OF THE DRAWINGS

The invention is described in detail below with reference to the accompanying drawings, in which.

DETAILED DESCRIPTION

Figure 1:
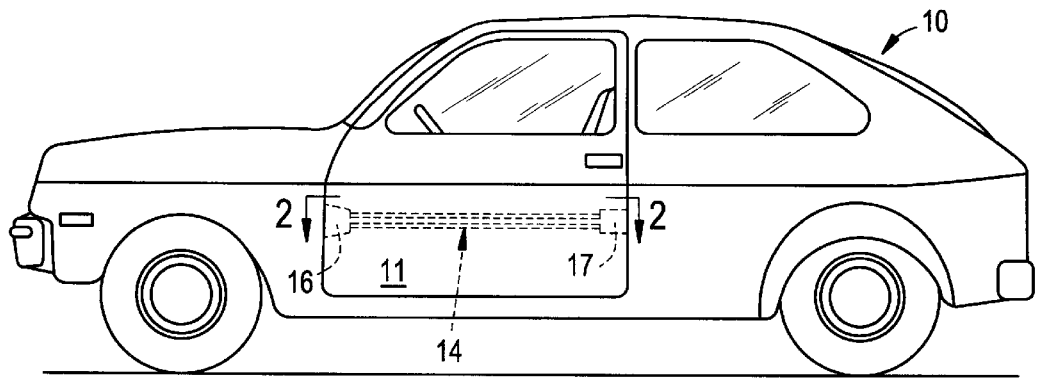
FIG. 1 is a side elevational view of an automotive vehicle showing a reinforcing member in the side door of the vehicle, in accordance with one embodiment of the invention.
Figure 2:
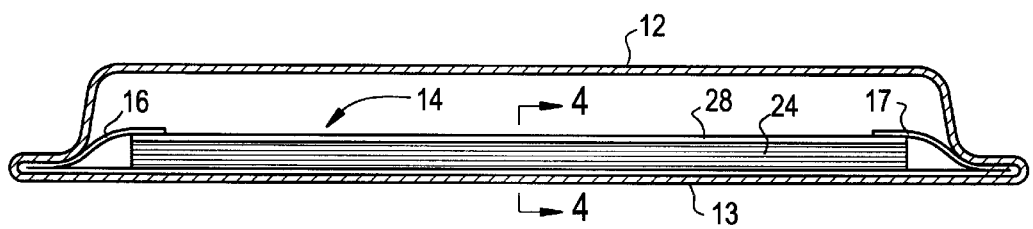
FIG. 2 is a schematic cross-sectional view taken generally along the line 2—2 of FIG. 1.

Referring to FIGS. 1 and 2, an automotive vehicle 10 is shown which has a side door 11 formed from spaced inner and outer panel portions 12 and 13, respectively. An elongated reinforcing beam 14 is positioned transversely within the door and is secured adjacent the inside surface of the outer panel 13 by means of suitable end brackets, shown schematically as 16 and 17, which transmit the load to the hinge and latch portions of the door structure, respectively. Typically, a gap of about 0.20 inches (about 5.0 mm) is provided between the inside surface of the outer panel 13 and the reinforcing bar 14 with soft rubber "gum drops" (not shown) disposed within the gap, so that the outer panel 13 is not deformed (i.e., creased) by relatively light loads applied to the outer panel 13, such as, for example, when a person simply leans against outer panel 13. As seen in FIG. 1, reinforcing beam 14 extends substantially horizontally across the width of side door 11 at approximately the waist height of an occupant seated in the vehicle. However, other orientations of reinforcing beam 14 within side door 11 can also be used.

Figure 4:
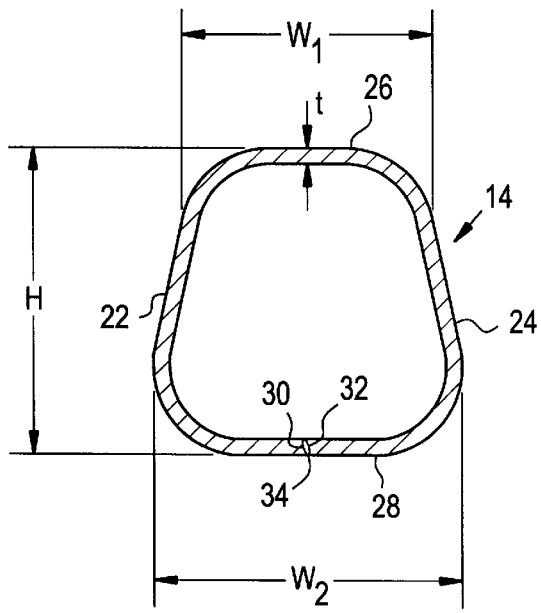
FIG. 4 is a cross-sectional view of the reinforcing member, taken generally along the line 4—4 of FIG. 2.

Although the invention is not limited to a specific cross sectional configuration, the preferred configuration can be described as generally trapezoidal-shaped. As illustrated in FIG. 4, reinforcing beam 14 has a thickness t, typically about 0.05 inches (about 1.27 mm) to about 0.10 inches (about 2.54 mm), and includes a pair of angled web portions 22 and 24, an outboard flange portion 26, and an inboard flange portion 28. Reinforcing beam 14 has an overall height H, typically about 1 inch (about 2.5 cm) to about 1.6 inches (about 4.1 cm). Outboard flange portion 26, has a width $W_1$, typically about 0.6 inches (about 1.5 cm) to about 1.2 inches (about 3.1 cm), and is substantially shorter than inboard flange portion 28, which has a width $W_2$, typically about 1 inch (about 2.5 cm) to about 1.6 inches (about 4.1 cm). Inboard flange portion 28 is formed by welding opposite edges 30 and 32 of reinforcing beam 14 to one another at a weld 34 after roll forming. Preferably, weld 34 is an induction weld that extends substantially uninterrupted along substantially the entire length of reinforcing beam 14.

Figure 3:
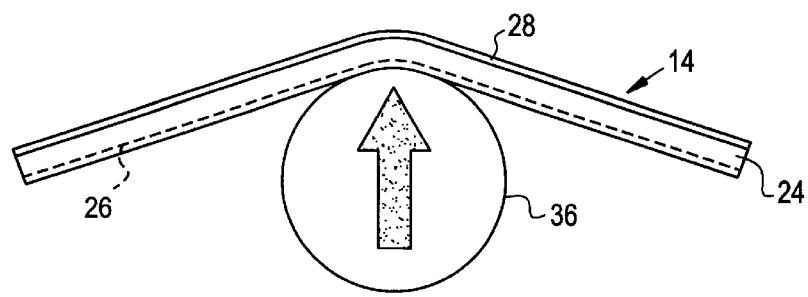
FIG. 3 is a schematic representation of the reinforcing member when subjected to a commonly used bending force test.

The prevailing government strength requirements for the side doors of motor vehicles are defined in the Federal Motor Vehicle Safety Standard No. 214 which specifies a certain minimum crush resistance for the vehicle when subjected to a specified test procedure. FIG. 3 is a schematic illustration of a beam test procedure used to assess side impact performance in connection with the vehicle door illustrated in FIGS. 1 and 2. As noted above, reinforcing beam 14 is mounted within door 11 so that the outboard flange portion 26 of reinforcing beam 14 is adjacent the inside surface of outer panel 23 and thus receives the initial deflecting force of a simulated impact. In the test procedure, a loading device or ram consisting of a rigid cylinder 36 of specified dimensions is used to apply a load to the outer surface of door panel 13 in an inward direction, as indicated by the large arrow, at a specified rate of travel. During the test, the applied load and the displacement are recorded either continuously or in increments, and from these data, the initial, intermediate, and peak crush resistances are determined. As seen in FIG. 3, the bending of reinforcing beam 14 during the test places outboard flange portion 26 in compression, inboard flange portion 28 in tension, and angled web portions 22 and 24 primarily in shear.

As an example, reinforcing beam 14 made from AISI Grade 190 SK high strength steel has been tested in bending and has been found to have the following capabilities for a 40 inch span having a thickness t of about 0.068 inches (about 1.73 mm), $W_1$ of about 0.85 inches (about 2.16 cm), $W_2$ of about 1.29 inches (about 3.28 cm), and H of about 1.36 inches (about 3.45 cm):

Weight per unit length=0.98 pounds/foot (1.46 Kg/m)

Peak load=2,714 pounds (12,072 N)

Deflection before drop in load=4.5 inches (11.43 cm)

Energy at 6" deflection=11,687 inch-pounds (1,320 N-m)

Energy at 7" deflection=13,301 inch-pounds (1,503 N-m)

Figure 4A:
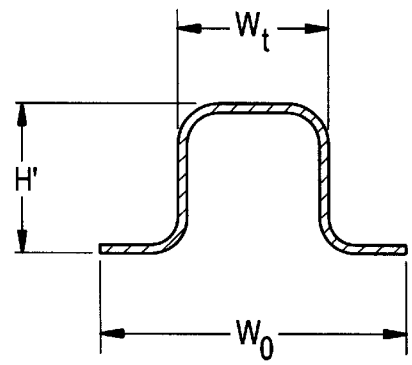
FIG. 4A is a cross-sectional view, similar to that of FIG. 4, showing a prior art reinforcing member.

For comparison, a prior art reinforcing beam made from the same type and thickness of steel, but having a hat-shaped cross-sectional geometry, as illustrated in FIG. 4A, with a top width, $W_1$ of about 1.40 inches (about 3.56 cm), an overall width $W_0$ of about 2.65 inches (about 6.73 cm), and a height H' of about 1.34 inches (about 3.40 cm), was found to have the following capabilities for a 40 inch (101.6 cm) span:

Weight per unit length=1.06 pounds/foot (1.58 Kg/m)

Peak load=2,727 pounds (12,130 N)

Deflection before drop in load=2.75 inches (7.00 cm)

Energy at 6" deflection=10,305 inch-pounds (1,164 N-m)

Energy at 7" deflection=11,411 inch-pounds (1,289 N-m)

Figure 5:
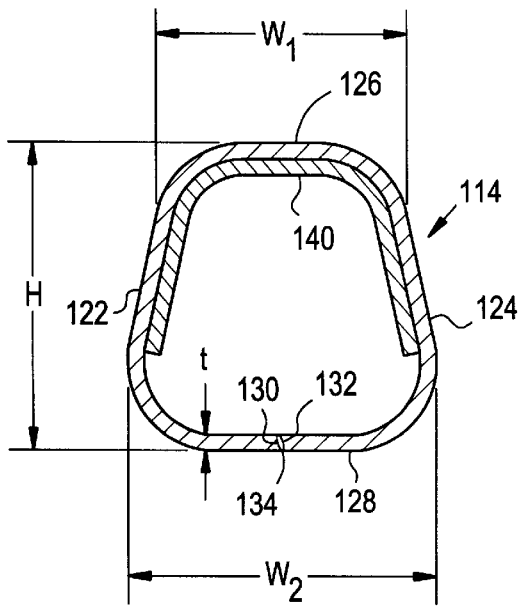
FIG. 5 is a cross-sectional view, similar to that of FIG. 4, showing a first alternative embodiment of the reinforcing member.

FIG. 5 illustrates a first alternative embodiment of the invention in which a reinforcing beam 114 is substantially identical to reinforcing beam 14 of FIGS. 1 through 4. However, reinforcing beam 114 includes an additional ultra high strength steel reinforcement 140 having a length of about 6 inches (about 15.24 cm) to about 12 inches (30.48 cm) and extending over at least the central part of its span. Reinforcement 140 preferably has a thickness of no more than about half of the thickness t of reinforcing beam 114 (e.g., no more than about 0.034 inches (about 0.86 mm) for a reinforcing beam 114 having a thickness t of about 0.068 inches (about 1.73 mm)) and is secured to the interior surface of an outboard flange portion 126 of reinforcing beam 114 by any suitable means, such as, for example, by spring action against the interior surface of reinforcing beam 114. Reinforcement 140 adds further impact absorbing capability for reinforcing beam 114, as compared to reinforcing beam 14, by delaying the onset of buckling of outboard flange portion 126 when subjected to an impact load.

Figure 6:
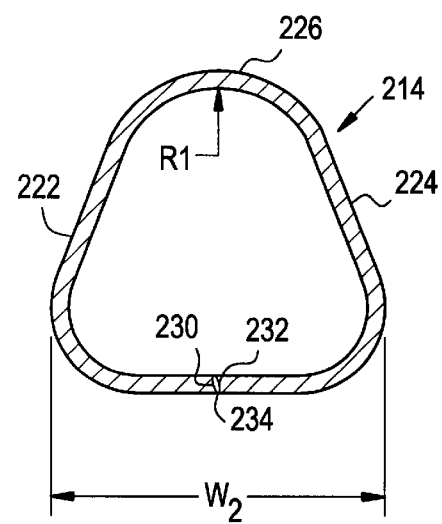
FIG. 6 is a cross-sectional view, similar to that of FIG. 4, showing a second alternative embodiment of the reinforcing member.

FIG. 6 illustrates a second alternative embodiment of the invention in which a reinforcing beam 214 is configured and sized similarly to reinforcing beam 14 of FIGS. 1 through 4. However, reinforcing beam 214 includes a rounded outboard flange portion 226 instead of the substantially flat outboard flange portion 26 of reinforcing beam 14. Rounded outboard flange portion 226 preferably has an inner radius of curvature R1 of about 0.30 inches (about 0.76 cm) to about 0.6 inches (about 1.52 cm).

It is believed that, for optimal performance, a reinforcing beam in accordance with the invention having a flat outboard flange portion should have the outboard flange portion width $W_1$ on the order of about 14 times the thickness t of the reinforcing beam, or less. The outboard flange portion width $W_2$ should also be equal to or less than 0.75 times the inboard flange portion width $W_2$, in order to avoid excessive strain in tension on the inboard flange portion during bending that occurs if the cross-sectional geometry approaches a substantially square shape.

Similarly, it is believed that, for optimal performance, a reinforcing beam having a rounded outboard flange portion in accordance with the invention should have the inner radius of curvature R1 on the order of about 9 times the thickness t of the reinforcing beam, or less.

The foregoing detailed description has been given for clearness of understanding only, and no unnecessary limitations should be understood therefrom, as modifications will be obvious to those skilled in the art.

What is claimed is:

1. A door impact beam for an automobile, said door impact beam comprising:

an elongated beam made from ultra high strength steel and having a thickness and having a closed cross-sectional geometry that is substantially trapezoidal shaped;

wherein said closed cross-sectional geometry includes an inboard flange portion and an outboard flange portion, wherein said outboard flange portion has a width substantially equal to or less than fourteen times the thickness of the beam and equal to or less than about 0.75 times the width of the inboard flange portion.

2. The door impact beam of claim 1, wherein the beam is formed from a single sheet of ultra high strength steel and the closed cross-sectional geometry is formed by welding opposite edges of the single sheet to one another.

3. The door impact beam of claim 2, wherein the closed cross-sectional geometry is formed by welding opposite edges of the single sheet to one another using an induction weld that extends substantially uninterrupted along substantially the entire length of the door impact beam.

4. The door impact beam of claim 1, wherein the beam further includes an additional reinforcement disposed within the interior of the closed cross-section of the beam, said additional reinforcement being disposed across at least the outboard flange portion and extending over at least a portion of the length of the beam.

5. The door impact beam of claim 4, wherein the additional reinforcement extends over a central portion of the length of the beam.

6. A door impact beam for an automobile, said door impact beam comprising:

an elongated beam made from ultra high strength steel and having a thickness and having a closed cross-sectional geometry that is substantially trapezoidal shaped;

wherein said closed cross-sectional geometry includes an inboard flange portion and an outboard rounded flange portion, wherein said outboard rounded flange portion has an inner radius of curvature substantially equal to or less than nine times said thickness.

7. The door impact beam of claim 6, wherein the beam is formed from a single sheet of ultra high strength steel and the closed cross-sectional geometry is formed by welding opposite edges of the single sheet to one another.

8. The door impact beam of claim 6, wherein the closed cross-sectional geometry is formed by welding opposite edges of the single sheet to one another using an induction weld that extends substantially uninterrupted along substantially the entire length of the door impact beam.

\* \* \* \* \*